US 6,565,725 B2

(12) United States Patent
Sugaya et al.

(10) Patent No.: US 6,565,725 B2
(45) Date of Patent: May 20, 2003

(54) METHOD FOR PRODUCING DEIONIZED WATER

(75) Inventors: Yoshio Sugaya, Yokohama (JP); Yukio Matsumura, Ichihara (JP); Hiroshi Toda, Ichihara (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 09/796,595

(22) Filed: Mar. 2, 2001

(65) Prior Publication Data
US 2001/0030129 A1 Oct. 18, 2001

(30) Foreign Application Priority Data
Mar. 2, 2000 (JP) .................................. 2000-058035

(51) Int. Cl.[7] .............................................. B01D 61/48
(52) U.S. Cl. ........................ 204/524; 204/525; 204/529; 204/533
(58) Field of Search ................................ 205/524, 525, 205/529, 533

(56) References Cited

U.S. PATENT DOCUMENTS

| 5,679,229 A | 10/1997 | Goldstein et al. | |
|---|---|---|---|
| 5,762,774 A | 6/1998 | Tessier | |
| 5,944,972 A | 8/1999 | Toda et al. | |
| 6,056,878 A | * 5/2000 | Tessier et al. | 204/524 |
| 6,071,397 A | 6/2000 | Terada et al. | |
| 6,149,788 A | * 11/2000 | Tessier et al. | 204/524 |

FOREIGN PATENT DOCUMENTS

| EP | 0 839 762 | 5/1998 |
|---|---|---|
| JP | 02 040220 | 2/1990 |
| WO | WO 00/07700 | 2/2000 |
| WO | WO 00/23382 | 4/2000 |

* cited by examiner

Primary Examiner—Arun S. Phasge
(74) Attorney, Agent, or Firm—Oblon, Spivak, McClelland, Maier & Neustadt, P.C.

(57) ABSTRACT

A method for producing deionized water by an electro-regenerating deionization method, which comprises employing a deionized water producing apparatus comprising an electrodialyzer, and ion exchangers being accommodated in the demineralizing compartments, supplying water to be treated in the demineralizing compartments and supplying a concentrated water to the concentrating compartments, wherein the concentrated water at the outlet of the concentrating compartments has a S value of 7 or more as defined by the following formula (1) and a pH of 2.5 or more:

$$S\ \text{value} = (\gamma - 420000 \times A)/(B \times (1-(A/0.004))^3) \quad \text{Formula}(1),$$

wherein $\gamma$ is electro-conductivity($\mu$S/cm), A is hydrogen ion concentration (mol/l), and B is magnesium ion concentration (ppb).

13 Claims, 1 Drawing Sheet

METHOD FOR PRODUCING DEIONIZED WATER

FIELD OF THE INVENTION

The present invention relates to a method for producing deionized water by using electro-regenerating deionization (hereinafter referred to as EDI). More particularly, it relates to a method for efficiently producing pure water or highly deionized water which is called e.g. ultra-pure water, which is used for manufacturing industries such as a pharmaceutical-manufacturing industry, a semiconductor-manufacturing industry and a food industry, or boiler water and other laboratory facilities.

BACKGROUND OF THE INVENTION

Heretofore, as a method for producing deionized water, it is common to obtain deionized water by passing water to be treated through a bed packed with ion exchange resins so that impurity ions are adsorbed on the ion exchange resin and removed. In this method, the ion exchange resins having its ion-exchanging and adsorbing abilities lowered have to be regenerated, and the regeneration is carried out usually by using an acid or an alkali. However, this method has problems such as troublesome operation for regenerating the ion exchange resins, and discharge of a waste liquid due to the acid or alkali used for the regeneration.

Therefore, a method for producing deionized water which requires no such regeneration is desired. From such a viewpoint, an EDI method which requires no regeneration operation by a chemical reagent such as an acid or an alkali has been recently developed and practically used. This method employs an electrodialyzer wherein anion exchange membranes and cation exchange membranes are alternately arranged to form demineralizing compartments and concentrating compartments alternately, and a mixture of anion exchange resins and cation exchange resins is accommodated in the demineralizing compartments. Voltage is applied while supplying water to be treated to the demineralizing compartments and supplying a concentrated water to the concentrating compartments arranged alternately to the demineralizing compartments to carry out electrodialysis to produce deionized water and at the same time, to carry out regeneration of the ion exchange resins. Accordingly, with said method, no additional regeneration of the ion exchange resins has to be carried out.

A conventional EDI method employs a deionized water producing apparatus comprising an electrodialyzer wherein cation exchange membranes and anion exchange membranes alternately arranged between an anode compartment provided with an anode and a cathode compartment provided with a cathode to form demineralizing compartments partitioned by the anion exchange membranes on the anode side and partitioned by the cation exchange membranes on the cathode side, and concentrating compartments partitioned by the cation exchange membranes on the anode side and partitioned by the anion exchange membranes on the cathode side, and anion exchange resins and cation exchange resins are accommodated in the demineralizing compartments. Impurity ions in water to be treated are removed by applying a voltage to the deionized water producing apparatus, while supplying the water to be treated to the demineralizing compartments and supplying a part of the water to be treated or already treated water as the concentrated water to the concentrating compartments.

According to this method, as mentioned above, the ion exchange resins are continuously regenerated simultaneously, and it therefore has an advantage that regeneration by a chemical reagent such as an acid or an alkali is not necessary, and a treatment of a waste liquid to be generated by the regeneration is not necessary. However, there are problems with the EDI apparatus that the electric resistance gradually increases due to hardness components in the water to be treated such as calcium ions, magnesium ions and the like, thus leading to increase in the applying voltage or to decrease in electric current, and further, the resistivity of the treated water tends to decrease due to decrease in the demineralization performances.

Many methods have already been proposed to overcome such problems, and examples of which include a method of preliminarily subjecting water to be supplied for an EDI apparatus to a reverse osmosis membrane treatment in two steps to remove hardness components as much as possible and then supplying said water as the water to be treated by the EDI method (JP-A-2-40220) and a method of subjecting water to electrolysis in an acidic water-producing electrodialyzer which is prepared separately, and passing the acidic water produced in an anode compartment through the concentrating compartments of the EDI apparatus (JP-A-10-128338). By employing such methods, long-term performance of the EDI method may be stabilized, but the investment cost tends to increase, and as a result, the advantages of the EDI system as compared with other deionization methods tend to diminish.

Further, a method has been proposed in which a liquid having an electro-conductance of from 100 to 800 $\mu$S/cm by adding an aqueous solution of a hydrochloride or sulfate of an alkali metal added thereto is supplied to the concentrating compartments of the EDI apparatus to stabilize the electric current in the EDI method to obtain a treated water having a high purity (JP-A-9-24374), but the long-term stability in the performance is not clarified.

The present invention relates to a method for overcoming the above problems of the conventional system for producing deionized water by EDI and the improved method for producing deionized water having long-term stability which has been proposed later. Thus, it is an object of the present invention to provide an expedient and inexpensive EDI demineralization method which can prevent and overcome decrease in performance due to impurities such as hardness components contained in the water to be treated, to be supplied in the EDI apparatus.

DISCLOSURE OF THE INVENTION

The present invention provides a method for producing deionized water to attain the above object, which comprises employing a deionized water producing apparatus comprising an electrodialyzer, wherein cation exchange membranes and anion exchange membranes are arranged alternately between an anode compartment provided with an anode and a cathode compartment provided with a cathode so as to form demineralizing compartments partitioned by the anion exchange membranes on the anode side and partitioned by the cation exchange membranes on the cathode side and concentrating compartments partitioned by the cation exchange membranes on the anode side and partitioned by the anion exchange membranes on the cathode side, and ion exchangers being accommodated in the demineralizing compartments, supplying water to be treated in the demineralizing compartments and supplying a concentrated water which is an electrolyte solution to the concentrating compartments under applying a voltage to transfer and remove impurity ions contained in the water to be treated, wherein the concentrated water at the outlet of the concentrating compartments has a S value of 7 or more as defined by the following formula (1) and a pH of 2.5 or more:

$$S \text{ value} = (\gamma - 420000 \times A)/(B \times (1 - (A/0.004))^3) \quad \text{Formula(1)},$$

wherein $\gamma$ is electro-conductivity ($\mu$S/cm), A is hydrogen ion concentration (mol/l), and B is magnesium ion concentration (ppb).

In accordance with the present invention, the S value of the concentrated water at the outlet of the concentrating compartments (hereafter, referred to as outlet concentrated water) is maintained 7 or more, whereby can be suppressed such problems that hardness components such as calcium ions, magnesium ions and the like are bonded to OH ions and carbonate ions to form slightly soluble salts in the vicinity of anion exchange membranes on the concentrating compartment side.

In the present invention, there are generally two types of means for maintaining the above-mentioned S value of the outlet concentrated water at 7 or more.

The first means is the one that water to be treated having the S value of 7 or more, preferably 10 or more is supplied to the demineralizing compartments of the deionized water producing apparatus. The second means is the one that in the case of water to be treated having the S value of less than 7, it is supplied to the demineralizing compartments of the deionized water producing apparatus as it is without particularly being subjected to a pretreatment. However, while supplying the water as it is, concentrated Mg ions are selectively removed by using chelate resins, or a monovalent cation type electrolyte is added to the concentrated water to adjust the S value of the outlet concentrated water at 7 or more, preferably at 10 or more.

In the present invention, one or both of the above-mentioned means may be employed, whereby the performance of the deionized water producing apparatus can be stabilized for a long period of time, even if hardness components in the water to be treated are not previously removed as least as possible. Particularly, even in the case of water to be treated containing hardly ionizable impurity components such as silica and carbon dioxide gas, it is possible to operate the deionized water producing apparatus at higher current density to remove such impurity components effectively. Further, the electro-conductivity of the concentrated water in the apparatus is increased, it is possible to operate the apparatus at lower voltage to reduce electric power cost.

The above-mentioned first means will be described more concretely. The S value of raw water for deionized water, such as river water, lake or pond water, underground water and tap water, is usually 1 at highest. With the first means, the S value of such raw water is made to 7 or more, in order to being used as water to be treated for the deionized water producing apparatus. For such a purpose, may be preferably employed either of the following methods: one method wherein an electrolyte other than Mg ions is added to the raw water to increase its electro-conductivity and the other method wherein Mg ions in the raw water are selectively removed or ion-exchanged with ions other than Mg ions.

In the former method, such problems may arise that the amounts of ions to be removed by EDI apparatus will be increased to decrease its treating rate, while the electro-conductivity of the water to be treated will be heightened. On the other hand, when the latter method is carried out, Mg ions can be selectively removed by using chelate resins, or can be ion-exchanged with ions other than Mg ions, preferably monovalent cation by using so called softener as a pretreatment for EDI apparatus, either of which is a preferable embodiment. However, if such ion-exchange pass break-through point, Mg ions will be suddenly leaked with a high concentration, which will obligatorily require troublesome maintenance works.

The inventors of the present invention have studied the above-mentioned problems and have found that a reverse osmosis membrane having specific properties is preferred as a pretreatment apparatus for EDI apparatus. That is, the above-mentioned problems have been found to be resolved by employing a reverse osmosis apparatus equipped with a reverse osmosis membrane having a T value of 10 or more, as defined by the formula (2) described below as a pretreatment apparatus for a deionized water producing apparatus and by supplying the water pretreated by using such a pretreatment apparatus to EDI apparatus. In the formula (2), a NaCl removal rate and an $MgCl_2$ removal rate, which are fundamental properties of a reverse osmosis membrane are used.

$$T \text{ value} = (100 - \text{NaCl removal rate } (\%))/(100 - MgCl_2 \text{ removal rate}(\%)) \quad \text{Formula(2)}$$

The NaCl removal rate and the $MgCl_2$ removal rate are obtained by measuring an aqueous solution having concentration of 0.1 mass % at 0.8 MPa at 25° C.

Figure 1:
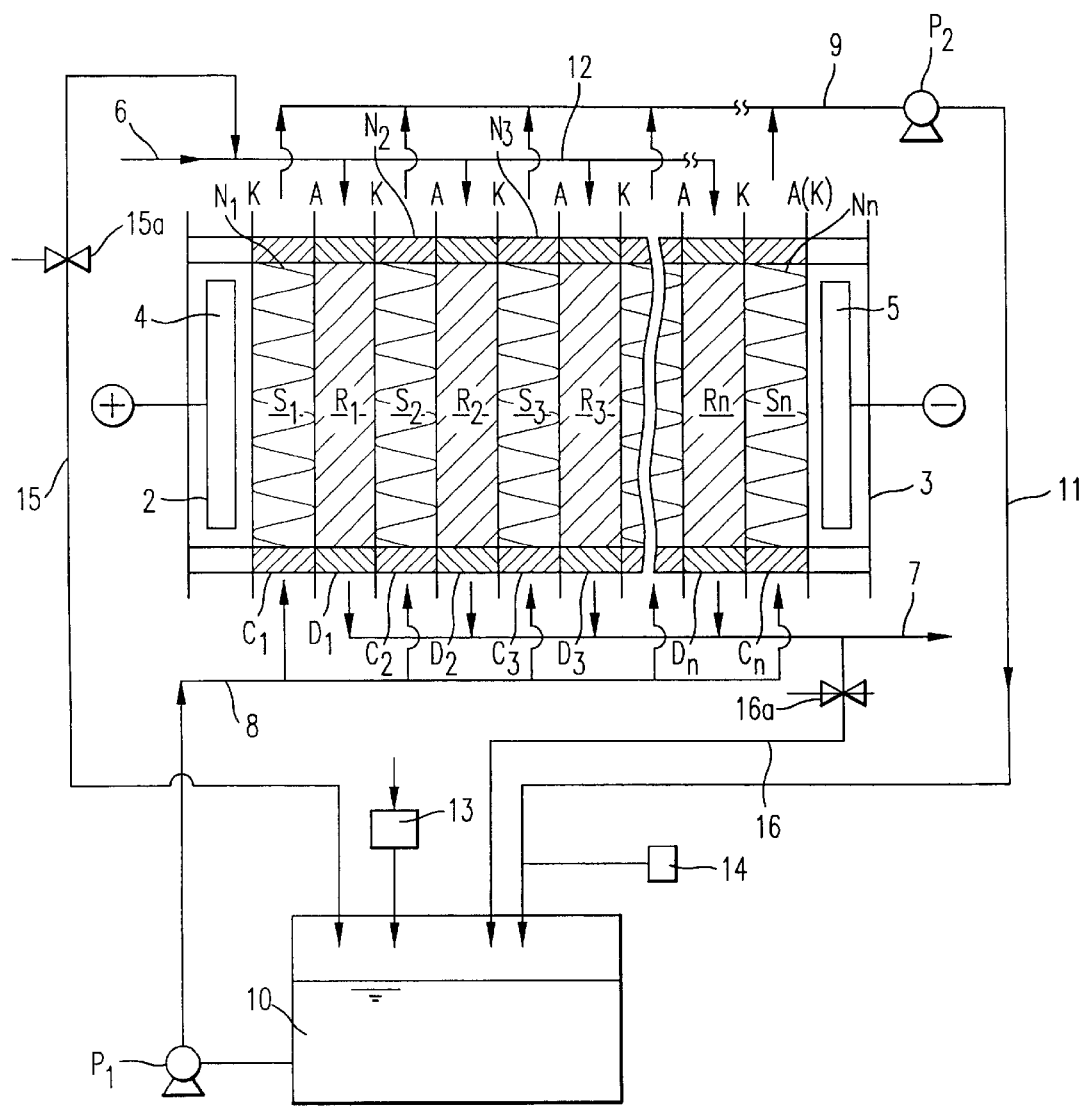
FIG. 1 is a schematic view of one embodiment of an electro-regenerating type deionized water producing apparatus which can be used for a method for producing deionized water.

A: anion exchange membrane,
K: cation exchange membrane,
1: elecrodialyzer,
2: anode compartment,
3: cathode compartment,
4: anode,
5: cathode,
6: inlet pipe for water to be treated,
7: outlet pipe for deionized water,
8: inlet pipe for a concentrated water,
9: outlet pipe for a concentrated water,
S1, . . . Sn: concentrating compartments,
R1, . . . Rn: demineralizing compartments,
D1, . . . Dn: demineralizing compartment frames,
C1, . . . Cn: concentrating compartment frames,
10: tank,
12: pipe for dividing water to be treated,
13: equipment for adding mono-cation type electrolyte,
14: electro-conductivity meter,
P1, P2: pumps

PREFERRED EMBODIMENT FOR CARRYING OUT THE INVENTION

In the following, the method for producing deionized water of the present invention will be described in more detail with reference to one embodiment using an electro-regenerating type deionized water producing apparatus shown in FIG. 1. However, it should be understood that the present invention is by no means restricted to such an embodiment and interpreted in accordance with the description of the claims.

The electro-regenerating type deionized water producing apparatus to be used in the method for producing deionized water of the present invention may be constructed by arranging anion exchange membranes A and cation exchange membranes K alternately at a certain interval from one another through demineralizing compartment frames D1, D2, D3 ... Dn and concentrating compartment frames C1, C2, C3 ... Cn, whereby an anode compartment 2, concentrating compartments S1,S2 ... Sn, demineralizing compartments R1,R2 ... Rn and a cathode compartment 3 will be formed. In the demineralizing compartments R1,R2 ... Rn, are accommodated and packed anion exchangers and cation exchangers. In the concentrating compartments S1,S2 ... Sn, are inserted and placed mesh-like structures, namely spacers N1,N2 ... Nn.

The anode compartment 2 and the cathode compartment 3 are provided with an anode 4 and a cathode 5 respectively, and a voltage is applied between them during production of deionized water. By so doing, anion components contained in water to be treated from a inlet pipe 6 to the demineralizing compartments R1,R2 ... Rn will be transferred to the concentrating compartment at their anode side through anion exchange membranes A, and cation components contained in water to be treated will be transferred to the concentrating compartment at their cathode side through cation exchange membranes K. As a result, the water to be treated will be deionized, and discharged through an outlet pipe 7 after passed through the demineralizing compartments.

On the other hand, a monovalent cation type electrolyte is added to the concentrated water to be supplied to the concentrating compartments so as to maintain S value, as defined by the formula (1), of the outlet concentrated water at 7 or more. Then, the resulting concentrated water is introduced to the concentrating compartments S1,S2 ... Sn through a inlet pipe 8, into which anions and cations transferred as mentioned above will be collected, and will be discharged from a outlet pipe 9 as the concentrated water. While FIG. 1 shows the case wherein water to be treated and a concentrated water flow in opposite directions (counter flow), it is of course possible for them to flow in the same direction (parallel flow).

In an electrodialyzer 1, cations contained in the water to be treated, captured by cation exchangers in each demineralizing compartment R1,R2 ... Rn will be moved by electric field to reach cation exchange membranes successively through neighboring cation exchangers contacting the cation exchanger capturing those cations. Then, these cations will be transferred to each concentrating compartment S1,S2 ... Sn through the cation exchange membrane. In the same way, anions contained in the water to be treated, captured by anion exchangers will reach anion exchange membranes successively through neighboring anion exchangers contacting the anion exchanger capturing those anions. Then, these anions will be transferred to each concentrating compartment S1,S2 ... Sn through the anion exchange membrane.

The electro-regenerating type deionized water producing apparatus to be used in the present invention shown in FIG. 1 illustrates the case wherein an S value of water to be treated is 7 or less. The concentrated water to be supplied to the concentrating compartments is recycled to a tank 10 installed separately by using pumps $P_1$, $P_2$, and water to be treated or a part of treated water is added and replenish to the tank 10 in a circulation system.

The above-mentioned water may be replenished using branched pipes 15,16 each provided with valves 15a, 16a branched from pipes 6,7. While the replenishing mount of the water to be treated or the treated water is not particularly limited, practically, it is preferably from 0.001 to 10 mass % (the same is applied to hereafter, unless otherwise stated.), relative to the total amount of water to be treated.

Into the concentrated water contained in the tank 10 in circulation system is added a monovalent cation electrolyte to maintain its S value as defined by the formula (1) at 7 or more. In this case, the S value is measured to adjust itself by an electro-conductivity meter 14 installed between a pipe 9 for discharging the concentrated water and the tank 10. When the S value of the outlet concentrated water and the S value of the water to be supplied to concentrating compartments are close to each other, the S value may be obtained by measuring the electro-conductivity of the concentrated water in the tank 10 using an electro-conductivity meter 14. In the apparatus shown in FIG. 1, the S value is adjusted by controlling the amount of a monovalent cation electrolyte from an addition equipment 13 to maintain it at the predetermined value after measuring its electro-conductivity.

For example, when Mg ion concentration of the concentrated water having a pH of 7 is 200 ppb and 2000 ppb, the amounts of a monovalent cation electrolyte from an adding equipment 13 are controlled to maintain its electro-conductivity at least 1,400 $\mu$s/cm and at least 14,000 $\mu$s/cm, respectively. Such a monovalent cation electrolyte to be added is preferably in a form of an aqueous solution since the addition amount can be controlled to be small. The concentration of the solution is preferably from 5 to 36%, particularly preferably from 10 to 20%.

In the apparatus of the present invention shown in FIG. 1, when deionized water is produced by using water to be treated having the S value of less than 7, a monovalent cation electrolyte is added to concentrated water to maintain its S value at the predetermined range. In the apparatus, the concentrated water is recycled for the above purpose, but the present invention is not limited to such an embodiment, although it is preferred.

Accordingly, the concentrated water is not required to be recycled. If not recycled, a monovalent cation electrolyte may be added directly to concentrated water to be supplied to the concentrating compartments. In this case, the monovalent cation electrolyte to be added is preferably in a form of an aqueous solution, as mentioned before, since the addition amount can be controlled to be small. The concentration of such a solution is preferably from 5 to 36%, more preferably from 10 to 20%.

In the present invention, a monovalent cation electrolyte is added to the concentrated water to maintain the S value at 7 or more at the outlet of concentrating compartments. The upper limit of the S value varies depending on the impurity components contained in the water to be supplied to demineralizing compartments and the current density flowing through ion exchange membranes installed in the electrodialyzer, and the S value is preferably at highest 30, more preferably from 13 to 15. The reason why the above upper limit is selected is as follows. When the S value is increased to raise the electro-conductivity of water to be supplied to concentrating compartments, electro-conductivity components will diffuse and leak from concentrating compartments to demineralizing compartments through ion exchange membranes partitioning concentrating compartments and demineralizing compartments, whereby the quality of the resulting treated water tends to be spoiled. To cope with this, it will be required to raise the current density flowing the electrodialyzer and use ion exchange membranes excellent in perm-selectivity performance. On the other hand, the reason why the lower limit of the S value is at 7 is that the stability of the performance will be deteriorated, if the S value is less than 7.

In the present invention, principally, the S value is adjusted by controlling the amount from an addition equipment 13 of a monovalent cation type electrolyte to maintain it at the predetermined value after measuring the electro-conductivity of the concentrated water by the electro-conductivity meter 14. However, when the concentrated water is recycled, the S value is adjusted, as secondary means, by controlling the amount of recycling water or the replenishing amount of water to be treated or treated water which is added to the re cycling water. Further, the concentrated water is preferably recycled by way of a tank. However, using such a tank is not essential, and it is possible to recycle it without using a tank. In such a case, the monovalent cation type electrolyte may be added, or the water to be treated or the treated water may be replenished at a midway of a recycling pipe.

The monovalent cation type electrolyte to be added to the concentrated water is not particularly limited, and can be used as long as a compound which is formed by a monovalent cation and a monovalent or multivalent anion bonded, and readily dissolved to provide a monovalent cation. Such a monovalent cation is preferably a hydrogen ion, a lithium ion, a sodium ion, a potassium ion, an ammonium ion, a quaternary alkyl ammonium ion, etc.

On the other hand, such a anion is preferably a multi valent ion such as a sulfate ion and a carbonate ion as well as a monovalent ion such a fluoride ion, a chloride ion and a nitrate ion. The above-mentioned electrolyte is preferably a compound which is formed by bonded between an anion and a cation selected from ions mentioned above as preferred examples. Particularly, hydrochloric acid, sodium chloride or potassium chloride is preferred from the viewpoint of the performance and easy availability.

The monovalent cation type electrolyte may be used alone or in a mixture of them. It is preferred to use a mixture of NaCl or KCl and hydrochloric acid and to maintain the pH of the concentrated water at the outlet of concentrating compartments within the range of from 2.5 to 6, preferably from 2.6 to 5, since the desired S value can be attained even if the adding amount of NaCl or KCl is controlled to be small. By so doing, possible deposition of calcium carbonate can be avoided, even when decarbonization or separation of carbon dioxide contained in water to be supplied to demineralizing compartments is not satisfactory.

In the present invention, the S value of the water to be supplied to demineralizing compartments is preferably 7 or more. Various raw water including service or tap water, underground water, river water, etc. is preferably pretreated by a reverse osmosis apparatus equipped with a reverse osmosis membrane having a T value, as defined by the formula (2), of 10 or more, preferably 25 or more, particularly preferably 50 or more, and has a S value of 7 or more and a electro-conductivity of 200 $\mu$s/cm or less.

As mentioned above, when the S value of the water to be treated is less than 7, it can be dealt with by adjusting the S value of the outlet concentrated water at 7 or more. As water to be treated, it is preferred to use one having a electro-conductivity of from 1 to 200 $\mu$s/cm and Mg ion concentration of from 1 to 200 ppb. When such water to be treated is supplied, long-term stability can be attained.

In the present invention, deionized water can be produced by using the above-mentioned water to be treated. Namely, while supplying water to be treated having a electro-conductivity of from 1 to 200 $\mu$s/cm and Mg ion concentration of from 1 to 200 ppb to demineralizing compartments, and supplying the concentrated water to concentrating compartments, and maintaining the S value of the concentrated water at 7 or more by adding a monovalent cation type electrolyte, a voltage is applied to the elecrodialyzer to deionize the water. The electric current amount per membrane area through which ions are transferred is preferably increased with an increase in the amount of ions contained in water to be treated, or with increases in electro-conductivity and in feeding amount of water to be treated. The current density is preferably from 0.1 to 2 A/dm$^2$, particularly preferably from 0.2 to 1 A/dm$^2$.

When silica or carbon dioxide is contained in the water to be treated in the present invention, the electric current amount will be increased to produce OH ions, whereby such silica or carbon dioxide will be ionized. Thus, they can be deionized from the water to be treated. If such a means is not carried out, with the passage of time, scale will be deposited on the surface of anion exchange membranes whereby perm selectivity of the membranes will be decreased and resistivity of treated water also will be decreased. Thus, long-term stability of the performance will be attained in the present invention.

As the cation exchange membrane, the anion exchange membrane, the electro-conductivity meter, the tank, the pump, etc. to be employed in the present invention, various known ones may be used without limitation. As the structure of the electrodialyzer, various known one may also be used without limitation. Further, as the shape of the ion exchanger, various one such as particle-like, fiber-like, sheet-like, etc. may be used. As the kind of functional group and ion exchange performance of the ion exchanger, it is preferred to use a mixture of anion exchangers and cation exchangers. The ion exchange group is preferably a strong acid type or a strong base type, although it can be either of a strong type or a week type.

EXAMPLE

Now, the present invention will be explained in further detail with reference to Examples. However, it should be understood that the present invention is by no means restricted to such specific Examples and interpreted in accordance with the description of the claims. While the electro-regenerating type deionized water producing apparatus shown in FIG. 1 was employed, the water to be treated and the concentrated water were flowed in parallel flow, which differs from that in the apparatus shown in the FIG. 1.

The concrete structure of the electrodialyser in the electro-regenerating type deionized water producing apparatus employed in this example is as follows.

Strong acid type exchange membranes (thickness: 600 $\mu$s, ion exchange capacity: 2.7 meq/g dry resin) and strong base type anion exchange membranes (thickness: 600 $\mu$s, ion exchange capacity: 2.1 meq/g dry resin) were arranged alternately through demineralizing compartment frames (made of polypropylene) and concentrating compartment frames (made of polypropylene), and fastened altogether to form a filter press type electrodialyzer (effective area: 507 cm$^2$ [width (=compartment frame width): 13 cm, length (=demineralizing compartment length): 39 cm]×3 pairs), wherein polypropylene-made nets are inserted into the concentrating compartments.

Each of the demineralizing compartments in the obtained electrodialyzer was packed with a sheet-like molded product made of a mixture of cation exchange resins, anion exchange resins and a binder in a dry state, and a spacer made of a synthetic resin was placed in each of the concentrating compartment to secure flowing paths. The above-mentioned two ion exchange resins employed were sulfonic acid type (H type) cation exchange resins (Diaion SK-1B, tradename, manufactured by Mitsubishi Chemical Corporation) having a particle size of from 400 to 600 μm and an ion exchange capacity of 4.5 meq/g dry resin and quarternary ammonium salt type (OH type) anion exchange resins (Diaion SA-10A, tradename, manufactured by Mitsubishi Chemical Corporation) having a particle size of from 400 to 600 μm and an ion exchange capacity of 3.5 meq/g dry resin, and they were packed so that the ion exchange capacity ratio was made 50/50.

Examples 1, 2 And Comparative Examples 1, 2

Water to be treated as identified in Table 1, which had been obtained by subjecting industrial water to sand filtration and then to a treatment by a reverse osmosis apparatus equipped with reverse osmosis membranes having T value of 1 (NaCl removal rate: 99%, $MgCl_2$ removal rate: 99%) in one step was supplied to the demineralizing compartments of the above obtained deionized water producing apparatus, and each electrodialysis operation in Examples 1, 2 and Comparative Examples 1, 2 was carried out.

TABLE 1

| | Electro-conductivity (μS/cm) | pH | Silica (ppb) | Hardness component (ppb as $CaCO_3$) | Mg (ppb) |
|---|---|---|---|---|---|
| Water to be supplied to demineralizing component | 10 | 5.6 | 600 | 200 | 20 |

In the operations of Examples 1, 2 and Comparative Example 1, as the water to be supplied to the concentrating compartments, the water which had been obtained by adding NaCl to water to be treated to adjust the S value and the electro-conductivity as identified in Table 2 was supplied and recycled. The operations of Comparative Example 2 is the case wherein water to be supplied to the concentrating compartments was recycled without adding an electrolyte thereto and with a utilization rate of 90%. The S value and the electro-conductivity are shown in Table 2.

TABLE 2

| | Ex. 1 | Ex. 2 | Comp. Ex. 1 | Comp. Ex. 2 |
|---|---|---|---|---|
| Flow amount of water to be treated (L/h/compartment) | 90 | 90 | 90 | 90 |
| Recycled flow amount of concentrated water (L/h/compartment) | 32 | 32 | 32 | 32 |
| Electro-conductivity of concentrated water (μS/cm) | 3000 | 2000 | 1000 | 100 |
| Hardness of concentrated water (ppm as CaCO3) | 2 | 2 | 2 | 2 |
| Mg ion concentration in concentrated water (ppb) | 200 | 200 | 200 | 200 |
| Concentrated water S value | 15 | 10 | 5 | 0.5 |
| pH | 6.0 | 6.0 | 6.0 | 6.0 |
| Current density (A/dm$^2$) | 0.4 | 0.2 | 0.4 | 0.2 |
| Recovery rate of treated water (%) | 90 | 90 | 90 | 90 |

The amounts of the water supplied to the demineralizing compartments and the concentrating compartments, the electro-conductivity, the hardness, and the Mg ion concentration of the concentrated water, and electric current density in the EDI apparatus are shown in Table 2.

In Examples 1–2 and Comparative Examples 1–2, each operation was continuously carried out for 1,000 hours under conditions as identified in Table 2, and the stability in the voltage, the resistivity of the treated water and the removal rate of silica were examined. Further, after the operation, the elecrodialyser was disassembled to inspect the scales deposited on the side of the concentrating compartments. The results are shown in Table 3.

TABLE 3

| | | Ex. 1 | Ex. 2 | Comp. Ex. 1 | Comp. Ex. 2 |
|---|---|---|---|---|---|
| Initial | Voltage (V/pair) | 3.4 | 3.1 | 3.2 | 3.5 |
| | Resistivity of treated water (MΩ · cm) | 17 | 17 | 17 | 17 |
| | Removal rate of silica (%) | 50 | 30 | 50 | 30 |
| After 1,000 hrs | Voltage (V/pair) | 3.4 | 3.2 | 10 | 10 |
| | Resistivity of treated water (MΩ · cm) | 17 | 16 | 3 | 2 |
| | Removal rate of silica (%) | 50 | 30 | 30 | 20 |
| Inspection after disassembled | Scale deposition on concentrating compartment side | None | None | Yes | Yes |

The results shown in Table 3 prove the following facts. In Examples, both of the resistivity and the removal rate of silica are not different between the beginning of the operation, and after 1,000 hours, no scale was observed on the side of the concentrating compartments, and the operation were stable for a long period of time. On the contrary, in Comparative Examples, both of the resistivity and removal rate of silica after 1,000 hours were substantially decreased comparing with those at the beginning of the operation, and particularly, the resistivity was remarkably decreased to a level between ⅕ and ⅛. The scale deposition on the side of the concentrating compartments was found by the inspection of the apparatus disassembled.

These results demonstrates that stable operation can be carried out for a long period of time by adding monovalent cation type electrolytes to the concentrated water to be supplied to the side of the concentrating compartments to maintain the S value within a certain range. The results also demonstrates that the removal rate of silica became higher as the current density became higher, and addition of monovalent cation type electrolytes can prevent decreasing of the removal rate of silica.

Example 3

In this Example 3, the electrodialysis was carried out in the same manner as in Example 1 except that water to be treated having a electro-conductivity of 13 μs/cm, and pH of 6.0, containing 600 ppb of silica, 300 ppb (as $CaCO_3$) of hardness components, 30 ppb of Mg and 1 ppm of $CO_2$ was supplied to the demineralizing compartments, and the concentrated water adjusted its electro-conductivity and pH at 1,800 μs/cm and 3.5, respectively, by adding sodium chloride and hydrochloric acid to a circulation tank for the concentrated water was supplied to the concentrating compartments.

The S value of the outlet concentrated water was 7.4, the concentration of Mg ion was 290 ppb, and the resistivity of the treated water after 1,000 hours operation was 16 MΩ•cm or more. No scale was found in the concentrating compartments by the inspection of the apparatus disassembled.

Example 4

In this Example 4, the electrodialysis was carried out in the same manner as in Example 1 except that water to be treated having a electro-conductivity of 15 μs/cm, and pH of 6.0, containing 600 ppb of silica, 500 ppb (as CaCO₃) of hardness components, 50 ppb of Mg and 2 ppm of CO₂ was supplied to the demineralizing compartments, and the concentrated water adjusted its electro-conductivity and pH at 2,500 μs/cm and 3, respectively, by adding sodium chloride and hydrochloric acid to a circulation tank for the concentrated water was supplied to the concentrating compartments.

The S value of the outlet concentrated water was 9.9, the concentration of Mg ion was 500 ppb, and the resistivity of the treated water after 1,000 hours operation was 16 MΩ•cm or more. No scale was found in the concentrating compartments by the inspection of the apparatus disassembled.

Example 5

Instead of the reverse osmosis apparatus used in Example 1, a reverse osmosis apparatus equipped with reverse osmosis membranes (NaCl removal rate: 65%, MgCl₂ removal rate: 99.4%, manufactured by Toray company, trade name: SU200S) having T value of 58.8 was employed to pretreat the water to be treated.

The electrodialysis was carried out in the same manner as in Example 1 except that the above pretreated water having a electro-conductivity of 70 μs/cm and a pH of 6.0, containing 7 ppb of Mg was used with recovery rate of water of 90% and at a current density of 0.8 A/dm².

The S value of the outlet concentrated water was 10, the concentration of Mg ion was 70 ppb, the electro-conductivity was 700 μs/cm, the resistivity at the beginning was 12 MΩ•cm and the resistivity after 1,000 hours operation was also 12 MΩ•cm. No scale as found in the concentrating compartments by the inspection of the apparatus disassembled.

Example 6

In this Example 6, the electrodialysis was carried out in the same manner as in Example 1 except that water to be treated having a electro-conductivity of 20 μs/cm, and pH of 6.0, containing 1,000 ppb of silica, 1,000 ppb (as CaCO₃) of hardness components, 100 ppb of Mg and 2 ppm of CO₂ was supplied to the demineralizing compartments, and the concentrated water adjusted its electro-conductivity and pH at 12,000 μs/cm and 6.0, respectively by adding sodium chloride to a circulation tank for the concentrated water was supplied to the concentrating compartments.

The S value of the outlet concentrated water was 12, the concentration of Mg ion was 1,000 ppb, and the resistivity of the treated water after 1,000 hours operation was 16 MΩ•cm or more. No scale was found in the concentrating compartments by the inspection of the apparatus disassembled.

According to the present invention, by adding monovalent cation type electrolyte to water to be supplied to the concentrating compartments in order to control its electro-conductivity within the certain range, the performance of the deionized water producing apparatus can be stabilized for a long period of time, even if hardness components in the water to be treated are not previously removed as least as possible. Particularly, even in the case of water to be treated containing impurity components such as silica and carbon dioxide gas, it is possible to operate the deionized water producing apparatus at higher current density to remove such impurity components effectively. Further, the electro-conductivity of the concentrated water in the apparatus is increased, it is possible to operate the apparatus at lower voltage to reduce electric power cost.

The entire disclosure of Japanese Patent Application No. 2000-58035 filed on Mar. 2, 2000 including specification, claims, drawings and summary are incorporated herein by reference in its entirety.

What is claimed is:

1. A method for producing deionized water by an electro-regenerating deionization method, which comprises employing a deionized water producing apparatus comprising an electrodialyzer, wherein cation exchange membranes and anion exchange membranes are arranged alternately between an anode compartment provided with an anode and a cathode compartment provided with a cathode so as to form demineralizing compartments partitioned by the anion exchange membranes on the anode side and partitioned by the cation exchange membranes on the cathode side and concentrating compartments partitioned by the cation exchange membranes on the anode side and partitioned by the anion exchange membranes on the cathode side, and ion exchangers being accommodated in the demineralizing compartments, supplying water to be treated in the demineralizing compartments and supplying a concentrated water which is an electrolyte solution to the concentrating compartments under applying a voltage to transfer and remove impurity ions contained in the water to be treated, wherein the concentrated water at the outlet of the concentrating compartments has a S value of 7 or more as defined by the following formula (1) and a pH of 2.5 or more:

$$S \text{ value} = (\gamma - 420000 \times A)/(B \times (1-(A/0.004))^3) \quad \text{Formula(1)}$$

wherein γ is electro-conductivity (μS/cm), A is hydrogen ion concentration (mol/l), and B is magnesium ion concentration (ppb).

2. The method for producing deionized water by an electro-regenerating deionization method according to claim 1, wherein the water having a S value of 7 or more is supplied to the demineralizing compartments of the deionized water producing apparatus.

3. The method for producing deionized water by an electro-regenerating deionization method according to claim 2, wherein the water pretreated with a reverse osmosis apparatus is supplied to the demineralizing compartments of the deionized water producing apparatus, the reverse osmosis apparatus being equipped with a reverse osmosis membrane having a T value of 10 or more as defined by the following formula (2) employing NaCl removal rate and MgCl₂ removal rate, which are fundamental properties of a reverse osmosis membrane:

$$T \text{ value} = (100 - \text{NaCl removal rate } (\%))/(100 - \text{MgCl}_2 \text{ removal rate}(\%)) \quad \text{Formula(2)}.$$

4. The method for producing deionized water by an electro-regenerating deionization method according to claim 3, wherein the water having an electro-conductivity of 200 μS/cm or less is employed.

5. The method for producing deionized water by an electro-regenerating deionization method according to claim 2, wherein the current density by applying a voltage to the deionized water producing apparatus is from 0.1 to 2 A/dm², relative to the effective area of ion exchange membranes.

6. The method for producing deionized water by an electro-regenerating deionization method according to claim 1, wherein the water pretreated with a reverse osmosis apparatus is supplied to the demineralizing compartments of the deionized water producing apparatus, the reverse osmosis apparatus being equipped with a reverse osmosis membrane having a T value of 10 or more as defined by the following formula (2) employing NaCl removal rate and $MgCl_2$ removal rate, which are fundamental properties of a reverse osmosis membrane:

$$T \text{ value}=(100-\text{NaCl removal rate } (\%))/(100-\text{MgCl}_2 \text{ removal rate}(\%)) \quad \text{Formula(2)}.$$

7. The method for producing deionized water by an electro-regenerating deionization method according to claim 1, wherein the water having a S value of less than 7 is supplied to the demineralizing solution in the deionized water producing apparatus, and adding a monovalent cation type electrolyte to the concentrating compartments, whereby the S value of the concentrated water at the outlet of the concentrating compartments is maintained to be 7 or more.

8. The method for producing deionized water by an electro-regenerating deionization method according to claim 7, wherein the monovalent cation type electrolyte to be added into the concentrated water is selected from the group consisting of hydrochloric acid, sodium chloride and potassium chloride.

9. The method for producing deionized water by an electro-regenerating deionization method according to claim 7, wherein the monovalent cation type electrolyte to be added into the concentrated water is a mixture of sodium chloride or potassium chloride, and hydrochloric acid, and the pH of the concentrated water at the outlet of the concentrating compartments is from 2.5 to 6.

10. The method for producing deionized water by an electro-regenerating deionization method according to claim 7, wherein the water to be treated having an electro-conductivity of from 1 to 200 $\mu$s/cm and a magnesium concentration of from 1 to 200 ppb is employed.

11. The method for producing deionized water by an electro-regenerating deionization method according to claim 7, wherein the current density by applying a voltage to the deionized water producing apparatus is from 0.1 to 2 $A/dm^2$, relative to the effective area of ion exchange membranes.

12. The method for producing deionized water by an electro-regenerating deionization method according to claim 1, wherein the S value of the concentrated water at the outlet of the concentrating compartments is 30 or less.

13. The method for producing deionized water by an electro-regenerating deionization method according to claim 1, wherein the current density by applying a voltage to the deionized water producing apparatus is from 0.1 to 2 $A/dm^2$, relative to the effective area of ion exchange membranes.

* * * * *